March 1, 1966           C. L. HURST           3,237,991
TRUCK WHEEL AND MOUNTING OF RIM THEREON
Filed Oct. 31, 1958           2 Sheets-Sheet 1
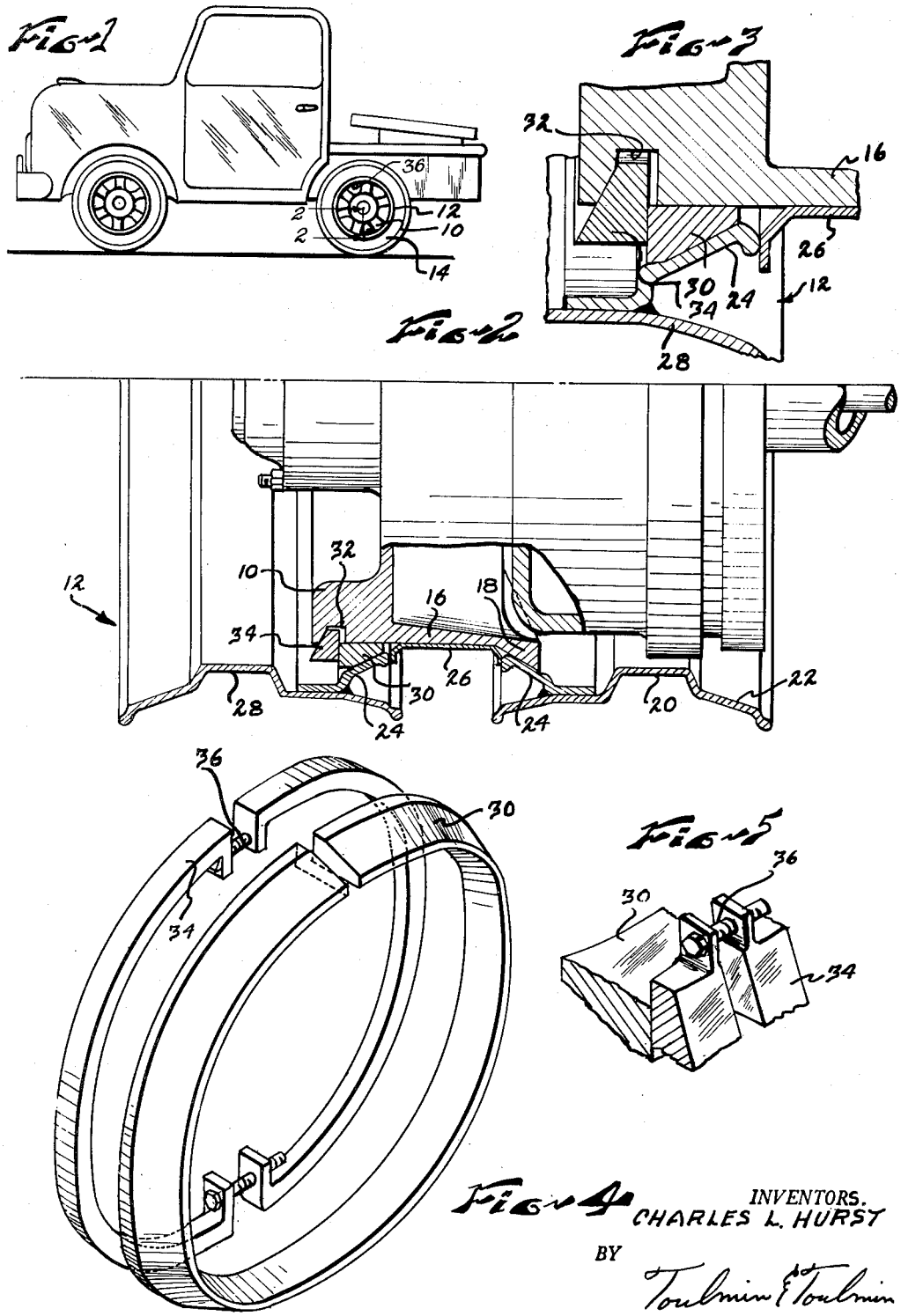
INVENTORS.
CHARLES L. HURST
BY
Toulmin & Toulmin
ATTORNEYS

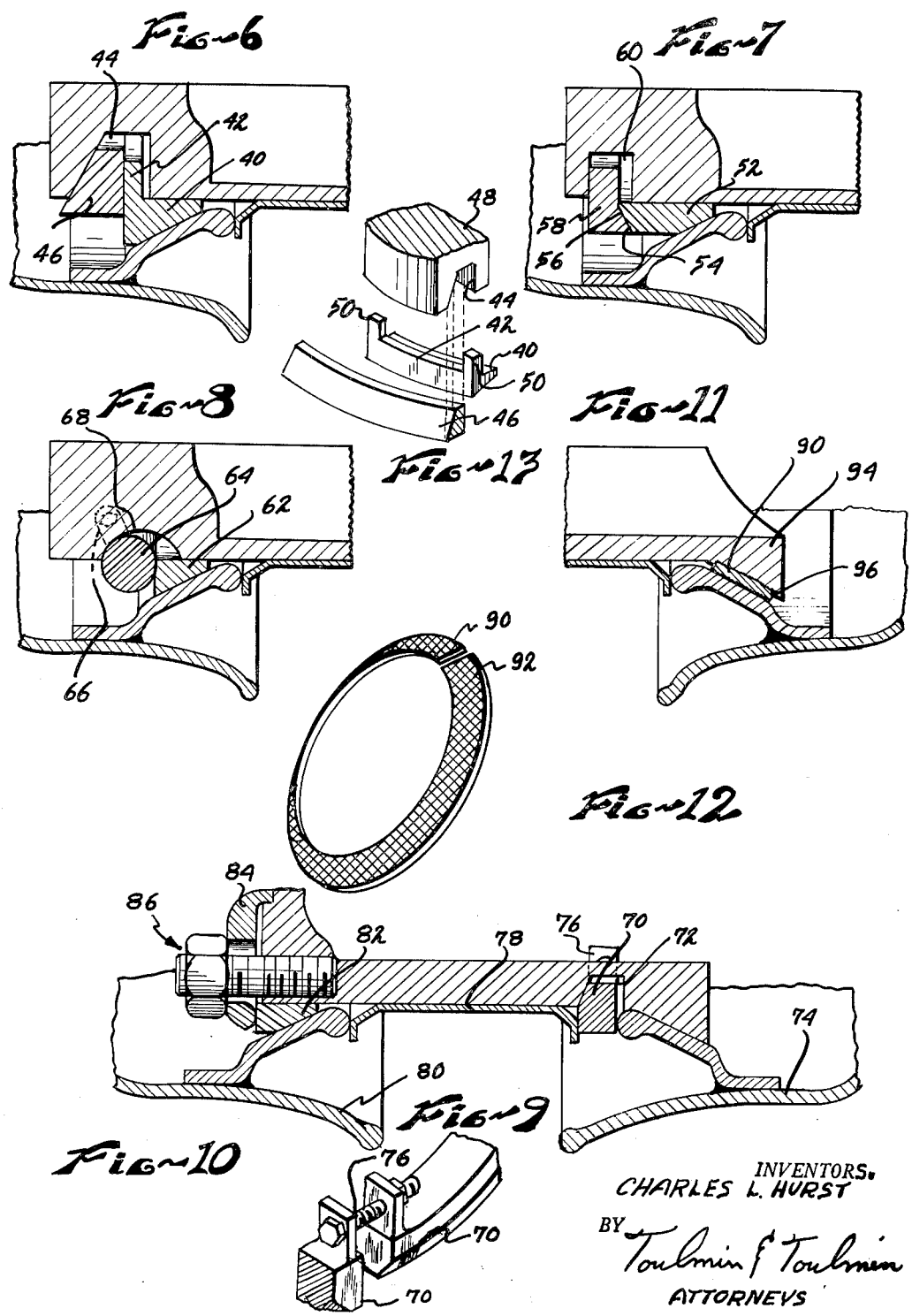

United States Patent Office 3,237,991
Patented Mar. 1, 1966

1

3,237,991
TRUCK WHEEL AND MOUNTING OF
RIM THEREON
Charles L. Hurst, Dayton, Ohio, assignor to Manufacturers Machine Company, Dayton, Ohio
Filed Oct. 31, 1958, Ser. No. 771,048
5 Claims. (Cl. 301—12)

This invention relates to truck wheels and to the mounting of rims for truck tires thereon.

In truck wheels, particularly cast through wheels, the rim is generally mounted on the wheel by clamps positioned at the ends of the spokes. These clamps are L shaped with a wedge nose that fits between the rim and the end of the spoke with there being studs in the wheels and nuts on the studs to draw the clamps up tight. Such clamps are quite likely to tilt or become cocked or maybe otherwise imperfectly aligned so that only a line or point pressure on the rim or wheel is had. Further, the clamps may be unevenly drawn up and if there is any clearance between the rim and the spokes, as usually is the case, this will result in misalignment of the rim and tire on the wheel either radially or laterally or both.

Because of the tendency referred to above of the clamps to be inadvertently cocked in one direction or another when they are put in position to tighten, there is many times insufficient pressure on the rim to prevent it from slipping on the wheel. This problem becomes more pronounced in the case of dual wheels since the inner rim is gripped on the wheel by pressure transmitted from the outer rim which the clamps engage.

Having the foregoing in mind it is a primary object of this invention to provide an improved arrangement for mounting rims on truck wheels, particularly cast wheels so that the foregoing drawbacks are eliminated and whereby the rims are more accurately aligned on the wheels and more positively supported in their aligned positions.

Still another object of this invention is the provision of an arrangement for mounting rims on truck wheels, particularly cast wheels, which will hold the rims against slippage, provide better alignment of the rims on the wheels, and at the same time provide for easy changing of the rims when necessary.

A particular object of this invention is the provision of the arrangement for producing substantially a full bearing against the rim with pressure being exerted substantially entirely about the rim at all critical points thereabout simultaneously.

A still further object of this invention is the provision of an arrangement for mounting rims on truck wheels, particularly cast wheels, in which minor variations in the dimensions of the rim and wheel are compensated so that the rim is firmly supported on the wheel in a properly aligned position.

Heretofore, truck wheels, as described above, have had clamps mounted thereon to hold rims and there have been provided studs in the wheels on which clamps are mounted. In many cases the wheels are cast and when they are machined to receive the studs, if blow-holes, voids, or other faults show up at the points of machining, the wheel becomes scrap or must be reoperated, and this represents a loss or an expense.

Accordingly, it is still another object of this invention to provide a truck wheel and a method of providing rim attaching means therein in which faults in the wheel casting such as blow-holes and voids do not cause the wheel to become scrap or any other way detract from the gripping of the rim on wheel.

It is also the object of this invention to provide a truck wheel and a means for retaining rims on the wheel which greatly reduces the amount of machining which must be carried out on the wheel to prepare it for use.

2

Still another object for the invention is the provision of means for providing a grip between the inner rim of a dual tire wheel and a wheel so that slipping of inner rim on the wheel is prevented.

These and other objects and advantages of this invention will become more apparent on reference to the following specification taken in connection with the accompanying drawings in which:

FIGURE 1 is a fragmentary elevational view showing the rear of a truck;

FIGURE 2 is a vertical sectional view indicated by line 2—2 on FIG. 1 showing the wheel and rims in section;

FIGURE 3 is a fragmentary sectional view drawn at enlarged scale showing a portion of the outer rim and the means for attaching the rim to the wheel;

FIGURE 4 is a perspective showing the wedge and clamp rings that attach the rims to the wheel;

FIGURE 5 is a fragmentary perspective view showing the manner in which the clamp rim is bolted together on wheel;

FIGURE 6 is a fragmentary view similar to FIG. 3 but showing modified arrangement of wedge ring and clamp ring;

FIGURE 7 is a view like FIGS. 3 and 6 but showing still another modified form which wedge ring and clamp ring can take;

FIGURE 8 is a view similar to FIGURES 3, 6 and 7 but showing the use of a clamp ring which is round in cross section;

FIGURE 9 is a sectional view showing the use of a wedge ring adjacent the inside rim while using still another modified clamp arrangement according to this invention for the outside rim;

FIGURE 10 is a fragmentary perspective view showing the manner of contracting the inner wedge ring of FIGURE 9;

FIGURE 11 is a fragmentary sectional view showing use of an inserted gripping member between the truck wheel and inner rim;

FIGURE 12 is a perspective view showing the inserted gripping member of FIGURE 10; and FIGURE 13 is a fragmentary perspective view showing one form which the modification of FIGURE 6 can take.

Referring to the drawings somewhat more in detail, FIGURE 1 shows a truck of a conventional type having rear drive wheels consisting of spoked inner portion 10 on which rims 12 are mounted and which rims carry tires 14. The wheels may be provided with either single or dual tires as may be necessary.

FIGURE 2 shows one rear wheel of the truck of FIGURE 1 in section with the tire removed for the sake of simplicity and in this view it will be seen that spoked portion 10 comprises a peripheral part 16 which may be continuous about the wheel or which may merely be the width of the individual spokes of the wheel. At the inner end of the peripheral portion 16 there is the upwardly outwardly extending angular flange portion 18 that provides a seat for inner rim 20. Each of inner rims 20 comprises tapering edge parts, one of which is at 22 is normally spaced from the spoke portion of the wheel and the other of which, at 24, is adapted for engaging the peripheral part of the wheel. Tapered flange portion 24 is generally provided by welding a suitably formed ring to the rim.

In the FIGURE 2 arrangement the inner rim is held against flange portion 18 by a spacer member 26 which is abutted at its outer edge by the tapering member 24 on outer rim 28.

Heretofor, cast clamps have been provided, one at the end of each spoke with studs extending axially from the spokes extending through the clamp so that nuts on the studs can be used to draw the clamp up and drive a tapered nose portion between spoke portion 10 and tapering portion 24 of the outer rim. As mentioned before, this does not provide for uniform gripping of the rim and where variations in width of the wheel or variations in size of the rims where the members 24 thereon occur, the clamps tilt and become strained and engage the rim only in a line contact thus greatly detracting from the tractive effort on the rim and also tending to distort the rim.

According to the present invention this is avoided by providing independent wedge means 30 fitting between member 24 of the outer rim and the wheel. This wedge means can be a plurality of segments, one for each spoke, or one wedge means spanning two or more spokes, or the wedge means can be in the form of a ring split in at least one place for ease of mounting on the wheel and also to permit the wedge means to contract into gripping relation with the wheel when pushed into engagement with the wheel and rim.

The wedge means may be pushed against the rim by any suitable clamp arrangement but it is preferred to form a grove means 32 about the wheel and to place therein a split clamp ring 34. The outer face of the clamp ring and the outer face of the groove means are tapered so that when the clamp ring is contracted in the groove means the wedge means is driven into position between the rim and wheel.

Bolts 36 are provided for drawing the ends of the clamp ring together and in this manner substantially uniform thrust is exerted on the wedge means and the rim is held against slippage on the wheel and is accurately located thereon and is not deformed. At the same time pressure is exerted on the inner rim by way of spacer 26 so that the inner rim is also fixedly and accurately held on the wheel.

It has been mentioned that the periphery of the wheel may be continuous or it may be discontinuous, extending only the width of the ends of the spokes and in the first case the groove means 32 will be continuous and in the second case the groove means will be discontinuous between the spokes.

When the wheel is of the wheel cast type, the rim is supported on the outer ends of the spokes and there is no peripheral portion of the wheel extending between the spokes. In this case the clamp ring is provided with lugs as illustrated in FIGURES 4 and 5 extending toward the center of the wheel and when the clamp ring is mounted on the wheel the lugs and bolts 36 are positioned between the spokes so as to be easily acessible for being tightened up with a wrench. For an even number of spokes in the wheel the clamp bolts are diametrically opposite each other but for an odd number of spokes the clamp bolts could be positioned otherwise, or the clamp ring could be made in three or more segments.

In FIGURE 6 a modified arrangement is illustrated wherein the wedge means 40 is segmented and this is necessary because the wedge means has a flange part 42 extending into groove 44 to provide a larger bearing area against clamp ring 46.

As will be seen in FIGURE 13 each segment of the wedge means 40 is somewhat longer than the spoke 48 of the wheel on which it rests. These wedge means could extend across two or three spokes, and being about 4 inches between the ends of the spokes if so desired.

Preferably drive lugs 50 are provided on the ends of segments to drive the wedges into position. In any case substantially a complete wedge ring is provided since the circumferential extent of each segment is sufficient to prevent warping of the rim and to provide a large area of contact therewith.

In FIGURE 7 there is shown an arrangement wherein the wedge means 52 which may be a split ring or segments has a tapered nose 54 cooperating with a tapered nose 56 on clamp ring 58, which, in this case, is disposed in a rectangular groove 60. It will be evident that FIGURE 7 represents a simple inversion of the first described modification.

In FIGURE 8 wedge means 62 are provided for being forced into position by clamp ring 64 which is circular in cross section, the ends being drawn together by bolts 66 and with there being an arcuate groove 68 to receive the clamp ring. This view illustrates the possibility of making one or both of the clamp ring and groove to an arcuate configuration.

FIGURE 9 shows a clamping wedge ring 70 provided in a groove 72 adjacent inner rim 74 with bolt means 76 being provided to bolt the clamp ring up tight. This gives a better gripping action of the inner rim and also accurately locates and supports the inner rim. Spacer 78 in this case merely backs up the outer rim 80.

Outer rim 80 has a wedge means 82 pertaining thereto which is either a split ring or a plurality of segments and instead of there being provided a clamp ring as in the previous modification, there is provided clamp members 84, one on each spoke drawn up with a stud and nut combination 86. The separation of the wedge means from the clamp 84 permits the wedge means to bear over a larger area of the rim than is otherwise possible and also insures that the wedge means will locate itself between the rim and wheel regardless of the position of the clamp members 84.

The gripping of the inner rim on the wheel can be augmented by introducing between the rim and wheel a relatively thin metal band 90 having a knurled or other rugged configuration on both faces thereof and with the ring being slightly harder than either the wheel or rim so that the rim will be gripped by the wheel and slipping prevented.

The flanged portion 94 which the ring or band 90 rests may be slightly recessed as at 96 so that the ring or band is accurately located on the wheel.

The arrangement of the present invention simplifies the machining of the wheels, prevents minor casting defects in the wheels from sometimes causing them to be scrapped or reoperated, supports the rims more accurately on the wheels, and more accurately locates the rims on the wheels and prevents distortion of the rims due to excessive clamping pressures.

The invention has been illustrated in connection with cast wheels having a spoked periphery but it will be evident that it could also be employed with cast wheels having a continuous periphery, or with pressed steel wheels. In any case the primary features of the present invention, involving the use of the wedge means, the clamp means for the wedge means whether alone or in combination with the friction enhancing band of FIGURES 11 and 12, would obtain.

It will be understood that this invention is susceptible to modification in order to adapt it to different usages and conditions; and, accordingly, it is desired to comprehend such modifications within this invention as may fall within the scope of the appended claims.

I claim:

1. In combination, a truck wheel having radial spokes each with an outer end peripheral portion adapted for receiving tire rims, inner and outer rims mounted on the outer ends of the spokes, each rim including an inclined mounting flange, means on the axially inner edge of said outer end peripheral portion of each spoke to abuttingly engage said inner rim mounting flange, a groove formed in the outer end of each spoke adjacent the axially outer edge thereof, a wedge ring disposed between said outer rim mounting flange and the ends of the spokes, and a clamp ring mounted in said groove and extending about all of said spokes, forcing said wedge ring into pressure engagement with said outer rim mounting flange, there being a taper one one side of said clamp ring and on one side of said groove, operable upon contraction of the clamp ring in the groove to force the wedge ring toward the outer rim mounting flange, means to contract the clamp ring in the groove, and a spacer member between the inner and outer rims holding them in spaced relation and transmitting clamping thrusts therebetween.

2. In combination; a cast truck wheel having spokes each with a peripheral portion, tapering flange means extending outwardly at the axially inner side of the peripheral portion of each spoke, inner and outer tire rims mounted on the said peripheral portions having tapered edge parts, the edge part on the inside rim engaging said flange means, a split tapered wedge ring between the tapered edge part of the other rim and the peripheral portions of the said spokes, a spacer ring disposed between said rims and in abutting engagement therewith, groove means in the peripheral portions of the spokes axially outwardly of the wedge ring, a split clamping ring in the groove means, bolt means in the clamping ring to draw the ends thereof together and contract the clamp ring in the groove means, the axially outer walls of said groove means tapering inwardly and the axially outer face of said clamp ring also tapering inwardly whereby contraction of the clamp ring in the groove means will cause the clamp ring to force the wedge ring axially inwardly toward the said other rim and in wedging engagement with said other rim and the ends of said spokes.

3. In combination; a cast truck wheel having spokes each provided with a rim receiving peripheral portion with tapering flange means extending outwardly therefrom at the axially inner side of the peripheral portion of each spoke, inner and outer tire rims mounted on the spoke peripheral portions having tapered edge parts with the edge part on the inside rim engaging said flange means, a split tapered wedge ring between the tapered edge part of the other rim and the spoke peripheral portions, a spacer ring disposed between said rims and in abutting engagement therewith, groove means in the spoke peripheral portions axially outwardly of the wedge ring, a split clamping ring in the groove means, bolt means in the clamping ring to draw the ends thereof together and contract the clamp ring in the groove means, and the axially outer face of said wedge ring and the axially inner face of said clamp ring having cooperating tapers operable to force the wedge ring toward the other rim when the clamp ring is contracted in the groove means.

4. In combination; a cast truck wheel having spokes each with a peripheral portion and with a tapering flange extending outwardly at the axially inner side of each spoke peripheral portion, inner and outer tire rims mounted on the spoke peripheral portions having tapered edge parts with the edge part on the inside rim engaging said flanges, a split tapered wedge ring between the tapered edge part of the other rim and the spoke peripheral portions, a spacer ring disposed between said rims and in abutting engagement therewith, groove means in the spoke peripheral portions axially outwardly of the wedge ring, a split clamping ring in the groove means, bolt means in the clamping ring to draw the ends thereof together and contract the clamp ring in the groove means, the axially outer wall of said groove means tapering inwardly and the axially outer face of said clamp ring also tapering inwardly whereby contraction of clamp ring in the groove means will cause the clamp ring to force the wedge ring toward the other rim, said wedge ring having a radially inwardly directed flange disposed in said groove means to increase the bearing area between the wedge ring and clamp ring.

5. In combination; a cast truck wheel having spokes each with a peripheral portion with tapering flange means at the axially inner side, inner and outer tire rims mounted on the peripheral portions having tapered edge parts with the edge part on the inside rim engaging said flange means, a split tapered wedge ring between the tapered edge part of the other rim and the spoke peripheral portions, a spacer ring disposed between said rims and in abutting engagement therewith, groove means in the spoke peripheral portions axially outwardly of the wedge ring, a split clamping ring in the groove means, bolt means in the clamping ring to draw the ends thereof together and contract the clamp ring in the groove means, the axially outer wall of said groove tapering inwardly and the axially outer face of said clamp ring also tapering inwardly whereby contraction of the clamp ring in groove will force the wedge ring axially inwardly toward the other rim, said groove means and clamping ring being arcuate in cross section.

References Cited by the Examiner
UNITED STATES PATENTS

| | | | |
|---|---|---|---|
| 1,151,086 | 8/1915 | Cole | 301—13 |
| 1,299,463 | 4/1919 | Hecht | 301—13 |
| 1,319,911 | 10/1919 | Spiegel | 301—22 |
| 1,804,937 | 5/1931 | Keller | 301—19 |
| 1,812,338 | 6/1931 | Holt | 301—20 |
| 1,838,050 | 12/1931 | Brunner | 301—13 |
| 1,981,639 | 11/1934 | Woodward | 301—13 |
| 2,024,264 | 12/1935 | Zipper et al. | 301—12 |
| 2,144,223 | 1/1939 | Klocke | 192—107 |
| 2,629,634 | 2/1953 | Lewis | 301—9 |
| 2,779,631 | 1/1957 | Powers | 301—13 |

FOREIGN PATENTS

| | | |
|---|---|---|
| 566,322 | 11/1923 | France. |
| 12,574 | 1896 | Great Britain. |
| 27,827 | 1906 | Great Britain. |

BENJAMIN HERSH, *Primary Examiner.*

RICHARD A. DOUGLAS, JACOB A. MANIAN,
*Examiners.*